United States Patent [19]
Chuang et al.

[11] Patent Number: 5,943,092
[45] Date of Patent: Aug. 24, 1999

[54] DIGITAL CONTROL CATHODE RAY TUBE TEST SYSTEM

[75] Inventors: Charles Chia-Ming Chuang; Huei-Mei Hsieh, both of Taipei; Hsueh-Sheng Chang, San-Chung, all of Taiwan

[73] Assignee: Dynacolor, Inc., San-Chung, Taiwan

[21] Appl. No.: 08/597,122

[22] Filed: Feb. 6, 1996

[51] Int. Cl.⁶ ........................................ H04N 17/00
[52] U.S. Cl. .................... 348/177; 348/189; 348/180
[58] Field of Search .................... 348/177, 180, 348/181, 189, 190, 191, 178, 179, 806, 805, 813; 371/24, 25.1, 57.1, 67.1, 71; 315/364, 367, 379, 387, 391, 399, 48, 368.11, 368.12; 324/804, 803; H04N 17/00

[56] References Cited

U.S. PATENT DOCUMENTS

| | | | |
|---|---|---|---|
| 4,439,735 | 3/1984 | Alvite | 348/189 |
| 4,688,079 | 8/1987 | Fendley | 348/190 |
| 5,657,078 | 8/1997 | Saito | 348/189 |

*Primary Examiner*—Sherrie Hsia
*Attorney, Agent, or Firm*—Bacon & Thomas

[57] ABSTRACT

A digital control CRT test system allows the testing of a CRT and various peripheral components thereof to be digitally controlled and supervised by a microprocessor. The test system comprises at least a microprocessor and at least a nonvolatile memory unit for storing at least a test parameter data set representative of a test setting for the CRT part under testing. Digital to analog converters in conjunction with analog test instruments are used to set the CRT part under testing in accordance with the test parameter data set stored in the nonvolatile memory unit. Further, analog to digital converters are used to convert the analog response signal indicative of whether the CRT part under testing is in good condition into digital form readable by the microprocessor. The microprocessor is able to generate accordingly a report indicative whether the CRT part under testing is in good condition.

31 Claims, 7 Drawing Sheets

DIGITAL CONTROL CATHODE RAY TUBE TEST SYSTEM

BACKGROUND OF THE INVENTION

1. Field of the Invention

The present invention relates to test instruments, and more particularly, to a test system based on a micro controller for digital control of the testing of a cathode ray tube (CRT) and various peripheral components thereof.

2. Description of the Prior Art

Cathode ray tube (CRT) is a display device widely used on oscilloscopes, computer monitors, TV, HDTV (high-definition TV), direct view and projection screens, and the like, for displaying traces, patterns, or pictures. A CRT comprises essentially a fluorescent screen, at least an electron gun (cathode) for emitting a beam of electrons, a heater for heating the cathode, a plurality of grids for controlling the flow of the electron beam from the cathode to the screen, a variety of coils for adjusting the focusing and positioning of the electron beam on the screen, and an anode disposed on the screen to attract the electron beam from the cathode to the screen.

For a monochrome CRT, there needs only one electron gun, whereas for a color CRT at least three electrons guns are needed, respectively for the red (R), green (G), and blue (B) channels. The plurality of grids used in the CRT are customarily referred to as G1, G2, and G3 in the industry. For high-resolution application, an additional grid G3-2 for fine focusing purpose is provided.

Further, the variety of coils in the CRT include essentially at least a horizontal deflection coil, a vertical deflection coil, a degaussing coil, a convergence coil, a rotation coil, and a purity coil. Besides these, there are provided other various peripheral components and controls on the CRT, including a video amplifier for amplifying the video signal to be displayed on the CRT screen, a tuning capacitor for the deflection yoke, S capacitors, and so on. All the aforementioned components and controls are conventional parts for building CRTs, which are well known to those skilled in the art of CRT design so that structural and functional description thereof will not be further detailed.

In the production process of a CRT and its peripheral components, front of screen performance of geometry color purity, rotor convergence, focus, and stray emission are essential operation and performance characteristics that nut be tested and adjusted. A test system for testing these CRT operation and performance characteristics must provide various voltages to the electrodes (cathode, grids, anode), heater, coils, video amplifier, degauss controller, and others.

Corventional CRT test systems consist of a collection of analog test instruments, each used for the testing of a particular operation and performance characteristic of the CRT. To operate these analog test instruments, the conventional CRT test systems are provided with a plurality of variable resistors, mechanical switches, and relays, which are used for control setting of each specific requirement such as setting a grid voltage or a defection center offset. Overall system control capability is lack in the conventional test systems. Among many control settings needed for the conventional test systems, for instances, Six control knobs are needed for testing a color CRT so as to set the bias and gain for each of the three electron guns. Moreover, over eight control knobs are needed to set geometry (vertical and horizontal), linearity, phase, size, pincushion, trapezoid, and raster centering.

Changing settings on the conventional CRT test systems is a very time-consuming and laborious work for the operator since there are so many parameters that must be entered manually. Certain settings can only be performed with the system power being turned off for example the deflection coil tuning capacitor setting the test system setting process is further aggravated since the operator must turn the system power off when changing the setting and then turn the power on to visually check the effects for several times.

Another drawback of the conventional test systems is that, since the control knobs are provided on the front panel, prescribed setting could be inadvertently changed by the operator if the operator accidentally touches anyone of the control knobs. Even worse, in the event of such an inadvertent change of the setting, the conventional test systems is unable to detect the faulty sting, which could cause-production quality drifts and system down time.

During the CRT production process, critical faults such as yoke winding shorts and high voltage arcing are common. Analog systems only have hardware protection circuit that may protect the instrument but still subject tee hardware to these abnormal conditions until the operator remove it. Over time, abnormal stress on the hardware will contribute to its shortened life. Once under fault condition, the conventional test system which is based on analog test instruments has only limited capabilities to convey the fault, fault diagnostics, and fault isolation messages to the operator.

Furthermore, for a multisync computer monitors, testing and adjustment of the CRT thereon should be performed at various frequencies. However, an automatic multiple frequency operation is presently still not available on conventional CRT test systems. Using the conventional CRT test system which is based on analog test instruments, the operator must shut down the system and readjust quite a number of control knobs before a different frequency setting cm be used, which is a very inconvenient and time-consuming procedure.

SUMMARY OF THE INVENTION

It is therefore a primary objective of the present invention to provide a digital control CRT test system bed on a microprocessor for controls and settings of the testing of a CRT and various peripheral components thereof.

It is another objective of the present invention to provide a CRT test stem which is capable of setting various frequencies automatically for the testing of a multisync monitor CRT.

In accordance with the foregoing and other objectives of the present invention, a new and improved CRT test system is provided. The test system comprises (a) at least a microprocessor; (b) at least a nonvolatile memory unit for storing at least a test parameter data set representative of a test setting for the CRT past under testing; (c) means, wider control by the microprocessor, for setting the CRT part under testing in accordance with the test parameter data set stored in the nonvolatile memory unit; (d) means for detecting a response signal from the CRT part during test procedure, the response signal being indicative of whether the CRT part under testing is in good condition; and (e) means, responsive to the response in, for generating a report indicative whether the CRT part under testing is in good condition.

In preferred embodiments, the setting means comprises (i) at least a digital-to-analog converter for converting the test parameter data set into analog signal; (ii) analog test means, coupled between the digital-to-analog converter and the CRT part under testing, for perform a test procedure on the CRT part under testing the analog test means generating an analog response signal indicative of test result; and (iii) at least an analog-to-digital converter, coupled between the analog test means and the microprocessor, for converting the analog response signal into digital form readable by the microprocessor.

The electrodes under testing include a heater, at least an electron gun, a plurality of grids and an anode; and the peripheral components under testing include horizontal deflection coils, vertical defection coils, degaussing coils, convergence coils, rotation coils, and purity coils.

The test system further comprises a communication port for connecting the test system with a personal computer and, in preferred embodiment, the communication port is an RS-232 communication port. A graphics card installed on the personal computer is used to generate a video signal representative a test pattern to the CRT.

An external pattern generator under control by the personal computer is used to generate a video signal representative a test pattern to the CRT. The test parameter data set can be downloaded from the personal computer to the nonvolatile memory unit on the test system. An external pattern generator can be used instead to generate a video signal representative a test pattern to the CRT.

In addition, the test system further comprises (i) means for detecting cults on critical points on the CRT; and (ii) an alarm coupled to the detecting means for generating a message indicative of a fault being detected by the detecting means.

Furthermore, the test system comprises mean for tuning an S capacitor coupled to horizontal yoke on the CRT under control by the microprocessor. The tuning means includes an array of tuning capacitors each being coupled in series to a relay having the on/off thereof controlled by a corresponding set of port on the microprocessor.

Still furthermore, the test system comprises, in case the CRT is a multisync CRT, means for detecting current operating frequency of the CRT and set the CRT for testing based on a particular test parameter data set corresponding to the current operating frequency being detected. The operating frequency detecting means includes a timer unit for counting the current operating frequency by detected.

It is the most important aspect of the present invention that all the functions briefly mentioned above are achieved under the control and supervision of the microprocessor. The testing is easy to carry out and quick to complete.

BRIEF DESCRIPTION OF DRAWINGS

The present invention cam be more fully understood by reading the subsequent detailed description of the preferred embodiments thereof with references made to the accompanying drawings, wherein.

DETAILED DESCRIPTION OF PREFERRED EMBODIMENT

In accordance with the present invention, all the analog test instruments that are conventionally used to test various parts of the CRT are placed under the supervision and control of a digital micro controller which functions to coordinate all the test activities. For a particular pat of the CRT under testing, the associated analog test instrument is modified to be controlled by analog signals in place of the conventional ways of using knobs. The analog signals are obtained from binary test parameter data set prestored in a nonvolatile memory unit and converted into analog forms for use by the analog test instrument.

Figure 1:
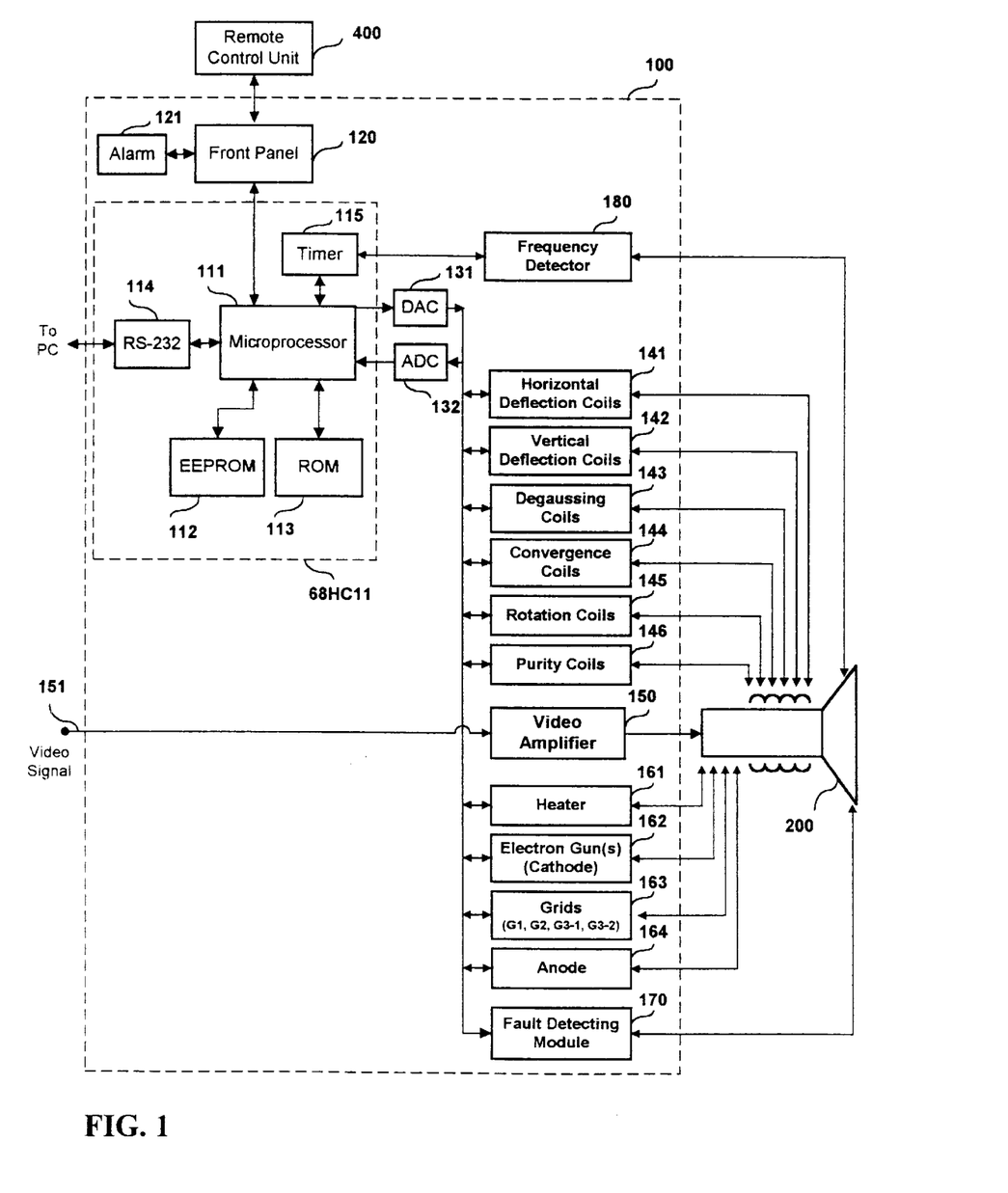
FIG. 1 is a schematic block diagram showing the digital control CRT test system according to the present invention.

Referring to FIG. 1, there is shown a schematic block diagram of the digital control CRT test system 100 according to the present invention used to test proper functioning of a CRT 200. The heart of the digital control CRT test system 100 is a micro controller embodied by an 8-bit 68HC11 micro controller which includes a microprocessor 111, a built-in 512-byte of EEPROM (which stands for electrically erasable programmable read-only memory and is a nonvolatile memory) 112, a 12 KB of ROM (read-only memory) 113 and a RS-232 communication port 114. The microprocessor 111 is used for supervision and control of the test procedure, the EEPROM 112 for storing test parameter. Besides, a front panel 120 which can be coupled to a remote control unit 400 for remote control of the digital control CRT test system 100 is provided for the operator to control and monitor test procedures.

Furthermore, a digital-to-analog converter (DAC) 131 is coupled to the microprocessor 111 for converting test parameter data set fetched by the microprocessor 111 from the EEPROM 112 into analog signals which are subsequently used to set various electrodes and peripheral components on the CRT 200 under proper conditions for the testing.

The peripheral components on the CRT 200 that are to be tested include horizontal deflection coils, vertical deflection coils, degaussing coils, convergence coils, rotation coils, and purity coils. The blocks 141, 142, 143, 144, 145, and 146 illustrated in FIG. 1 each represents an analog circuit and an analog test instrument that are used to test the nominal peripheral component. The analog circuit receives from the DAC 131 an analog signal indicative of proper test setting for the nominal CRT part and the analog test instrument will perform a test procedure on the CRT part accordingly.

Moreover, the electrodes on the CRT 200 that are to be tested include a heater, at least an electron gun (cathode), a plurality of grids which include G1, G2, G3–1, and G3-2, and an anode. The blocks 161, 162, 163, and 164 illustrated in FIG. 1 each represents an analog circuit and an analog test instrument that are used to test the nominal electrode.

During testing, the analog test instrument will detect the response from the CRT part under testing. The response indicates whether the CRT part under testing is in good condition or not. The response is also an analog signal which is sent to an analog-to-digital converter (ADC) 132 to be converted into a digital form readable by the microprocessor 111. Comparing the response with data prestored in the EEPROM 112, the microprocessor. 111 is able to determine whether the part under testing is in good condition or not and generate a report that tells the tested result of each CRT part.

By incorporating the EEPROM 112 on the digital control CRT test system 100, several complicated system settings can be saved at one time. Production model change is very simple since the operator only has to select a different memory location rather than performing physical setting of a plurality of switches and dials. Line change over time can be shortened from several minutes down to several seconds, whereby production efficiency is significantly increased. The use of the EEPROM 112 and the ADC 132 thus can be used to audit the system setting so as to avoid accidental changes in the settings.

The digital control CRT test system 100 is provided with two ports, the RS-232 communication port 114 and the video port 151, which allow connection to external devices, The RS-232 communication port 114 allows the digital control CRT test system 100 to be connected to a personal computer (PC) 300 (see FIG. 2) and the video port 151 allows the video amplifier 150 coupled to the CRT 200 to receive a video signal representative of a test pattern from an external signal source such as a pattern generator. When connected via the RS-232 communication port 114 to the PC 300, the digital control CRT test system 100 is significantly increased in capabilities to conduct the testing on CRTs. Parameter settings can be verified on the PC 300 prior to downloadig to the digital control CRT test system 100. The use of the RS-232 communication port 114 for downloading ensures compatibility of settings from machine to machine. With fault conditions and diagnostic information transferred to the PC 300, the PC monitor is capable of providing levels of detailed information to the operator, significantly more powerful than analog-based test systems. Based on other sensor inputs connected to the PC 300, automatic alignment can be achieved by issuing commands via the RS-232 communication port 114. Various configurations of the digital control CRT test system 100 connected to external devices via the RS-232 communication port 114 and the video port 151 are possible, as for example described in the following with reference to FIG. 2 through FIG. 4.

Figure 2:
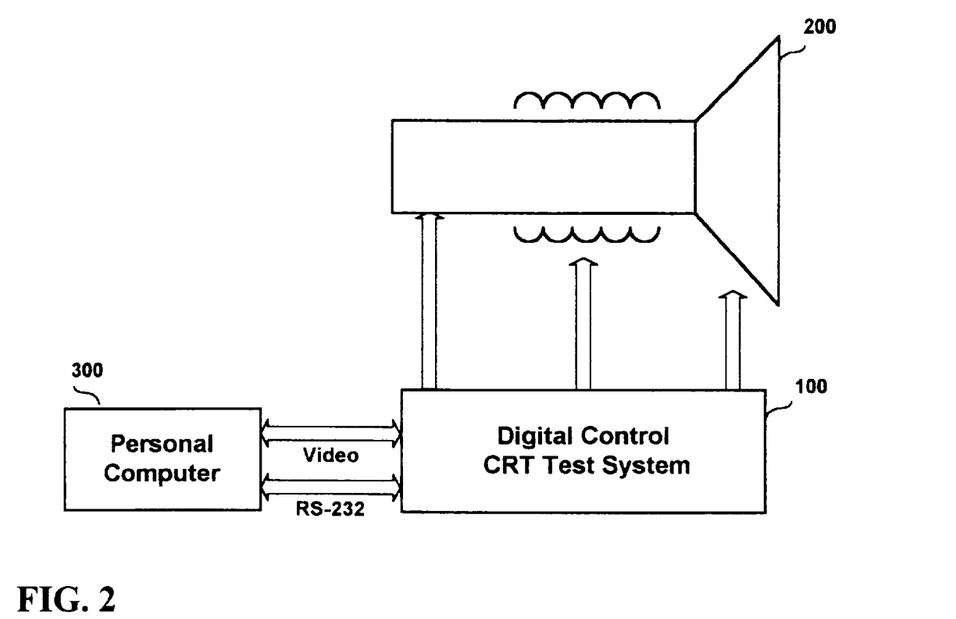
FIG. 2 is a schematic block diagram shot the first preferred embodiment of system application of the digital control CRT test system connected with a PC.

Referring to FIG. 2, there is shown a schematic diagram depicting the first preferred embodiment of system application of the digital control CRT test system 100 in conjunction with the PC 300. The PC 300 can be an IBM PC or compatible based on Intel's 80×86 or Pentium processor. The RS-232 communication port 114 is used for data communication between the digital control CRT test system 100 and the PC 300. Further, a PC graphics card (not shown) installed on the PC 300 is used as pattern generator which generates a video signal representative of a test pattern for the CRT test application. With this configurations test parameter data set can be programmed in advance and stored in the PC 300 and, when needed to set test settings for the CRT, downloaded via the RS-232 communication port 114 to the EEPROM 112 on the digital control CRT test system 100.

Figure 3:
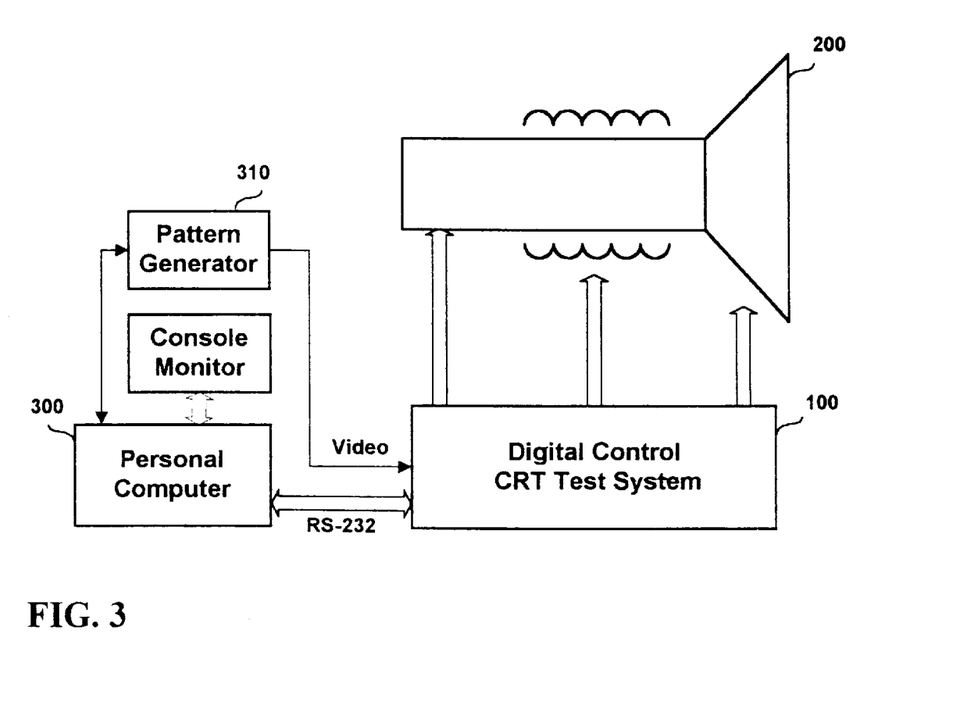
FIG. 3 is a schematic block diagram showing the second preferred embodiment of system application of the digital control CRT test system connected with a PC and an external pattern generator.

Referring further to FIG. 3, there is shown a schematic diagram depicting the second preferred embodiment of system application of the digital control CRT test system 100. This embodiment differs from the previous one in that an external pattern generator 310 is used instead of the PC graphics card for generating a video signal representative of a test pattern for the CRT test application. The RS-232 communication port 114 is also used here for data communication between PC 300 and the external pattern generator 310. The operation of the external pattern generator 310 is under control by the PC 300.

Figure 4:
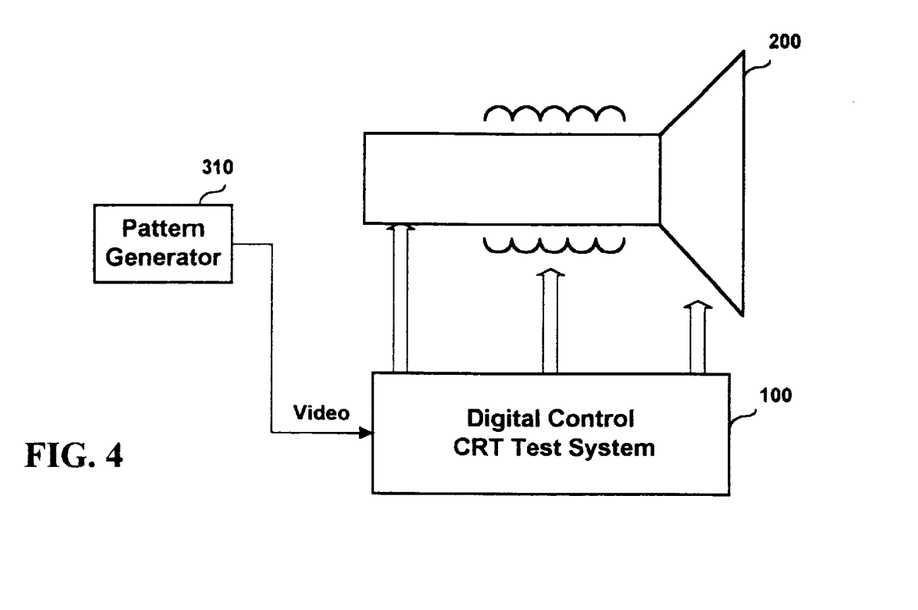
FIG. 4 is a schematic block diagram showing the third preferred embodiment of system application of the digital control CRT test system connected with an external pattern generator.

Referring to FIG. 4, there is shown a schematic diagram depicting the third preferred embodiment of system application of the digital control CRT test system 100. In this embodiment, the digital control CRT test system 100 is operated without using a PC. All configuration information is stored in the nonvolatile memory unit in the digital control CRT test system 100.

Referring back to FIG. 1, the digital control CRT test system 100 is further provided a fault detecting module 170 coupled via the ADC 132 to the microprocessor 111. The fault detecting module 170 is used to monitor various critical points on the CRT 200 for fault conditions such as cooling fan stopped or interruption in signal input. In the event that any fault condition occurs, the microprocessor 111 will inform the operator of such a condition. If the fault condition is a critical one, the microprocessor 111 will first convey fault message, fault diagnostics, and fault isolation to the operator and then shut down the system, which would significantly increase the robustness and ease of repair of the system Since the microprocessor 111 is able to quickly disable and remove hardware from critical faults, hardware is not exposed to fault conditions for extended duration. This feature would significantly boost the system reliability.

Figure 5:
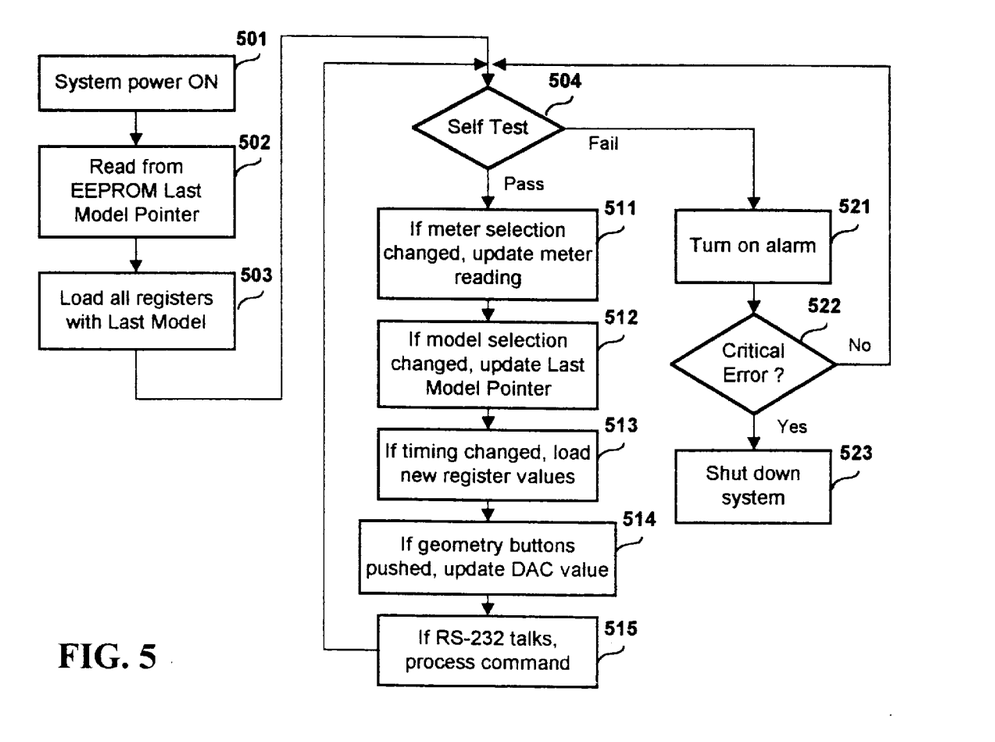
FIG. 5 is a flow diagram sowing a procedure carried out by the digital control CRT test system for self test.

FIG. 5 shows a flow diagram of the procedure carried out by the microprocessor 111 for detecting errors in the operation of the CRT 200. At step 501, the system power is turned on. At step 501, the microprocessor 111 reads from the EEPROM 112 the location of the Last Model Pointer. A step 503, the microprocessor 111 microprocessor 111 loads all registers with Last Model. At step 504, self test is performed. If pass, the procedure goes to step 511 in which the meter selection is checked. If is has been changed, the meter reading is updated. At step 512, if model has been changed, the Last Model Pointer is updated. At step 513, if to has been changed, new register values are loaded. At step 514, if geometry buttons are pushed, DAC value is updated. At step 515, if RS-232 talks, the incoming command is processed. Subsequently, the procedure returns to the stop 504 to perform self test again. If result of the self test is fail, the procedure goes to step 521 in which the alarm 121 is turned on. At step 522, it is checked that whether the error is critical or not. If a critical error, the procedure goes to step 523 in which the system is shut down; otherwise, the procedure returns to step 504 to perform the self test again.

By means of a timer unit 115 on the micro controller, the digital control CRT test system 100 is capable of identifying and tracking different operating frequencies on a multisync CRT. Whenever the curt operating frequency on a multisync CRT changes to another, the microprocessor 111 can update setting registers which are subsequently sent to the DAC 131 to generate new analog controls to the multigync CRT.

CRT focus voltage should be varied in response to a change in the imparting spot of the electron beam on the screen so as to keep the image in shape focus at all points on the screen. This action is usually referred to as dynamic focus. The microprocessor 111 can be used to generate a corresponding signal waveform for dynamic focus. CRT side pincushion adjustment also requires dynamic waveform. Software stored in the EEPROM 112 can be used to produce sophisticated waveforms to emulate user circuit much better than analog means. CRTs that are adjusted with such a closely matched condition would increase CRT compatibility to user circuit and also elevate the level of performance beyond what is possible before.

Figure 6:
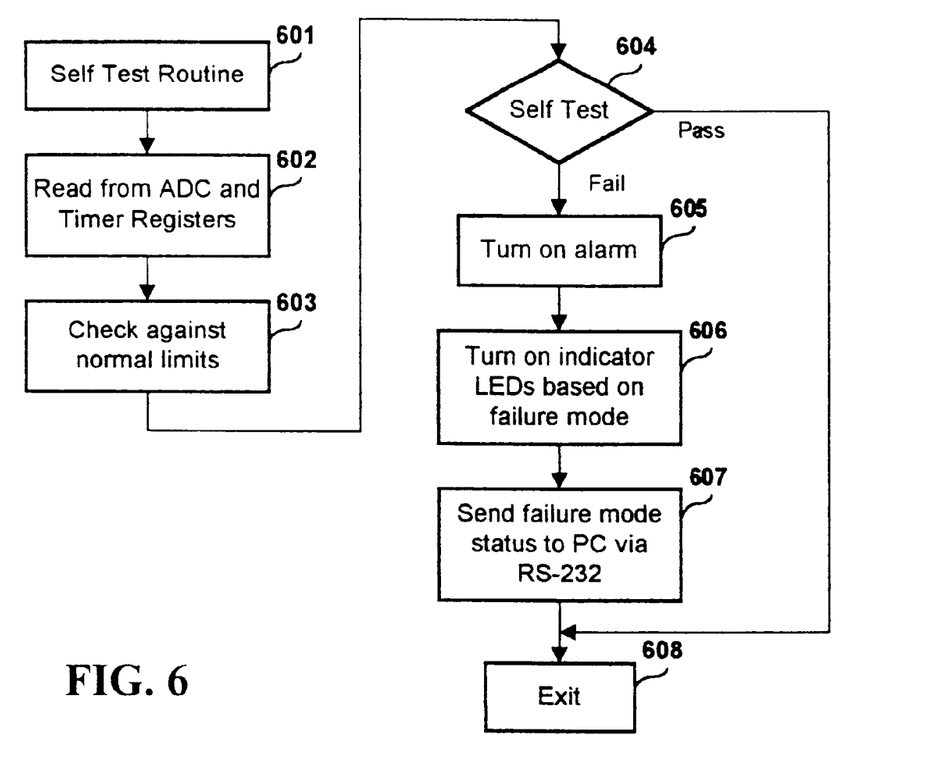
FIG. 6 is a flow diagram showing a self test routine carried out by the digital control CRT test system.

FIG. 6 shows a flow diagram of a preferred embodiment of self test routine on the microprocessor 111. From digital input ports, analog input ports, and timer input ports, system status is analyzed against previously set limits for normal operation. If error conditions are detected, the microprocessor 111 will display the corresponding error code on the front panel 120 and also send the failure mode to the PC 300. In the procedure at the first step 601, the self test routine is initiated. At step 602, the microprocessor 111 reads data from the ADC 132 and timer registers. At step 603, the data are checked against normal limits. At step 604, self test is performed. If pass, the procedure goes to step 608 in which the procedure is ended, otherwise, the procedure goes to step 605 in which the alarm 121 is turned on. At step 606, corresponding indicator LEDs are turned on based on the failure mode. At step 601, the microprocessor 111 sends the failure mode status via the RS-232 communication port 114 to the PC 300. Subsequently at step 608, the procedure is ended.

Figure 7:
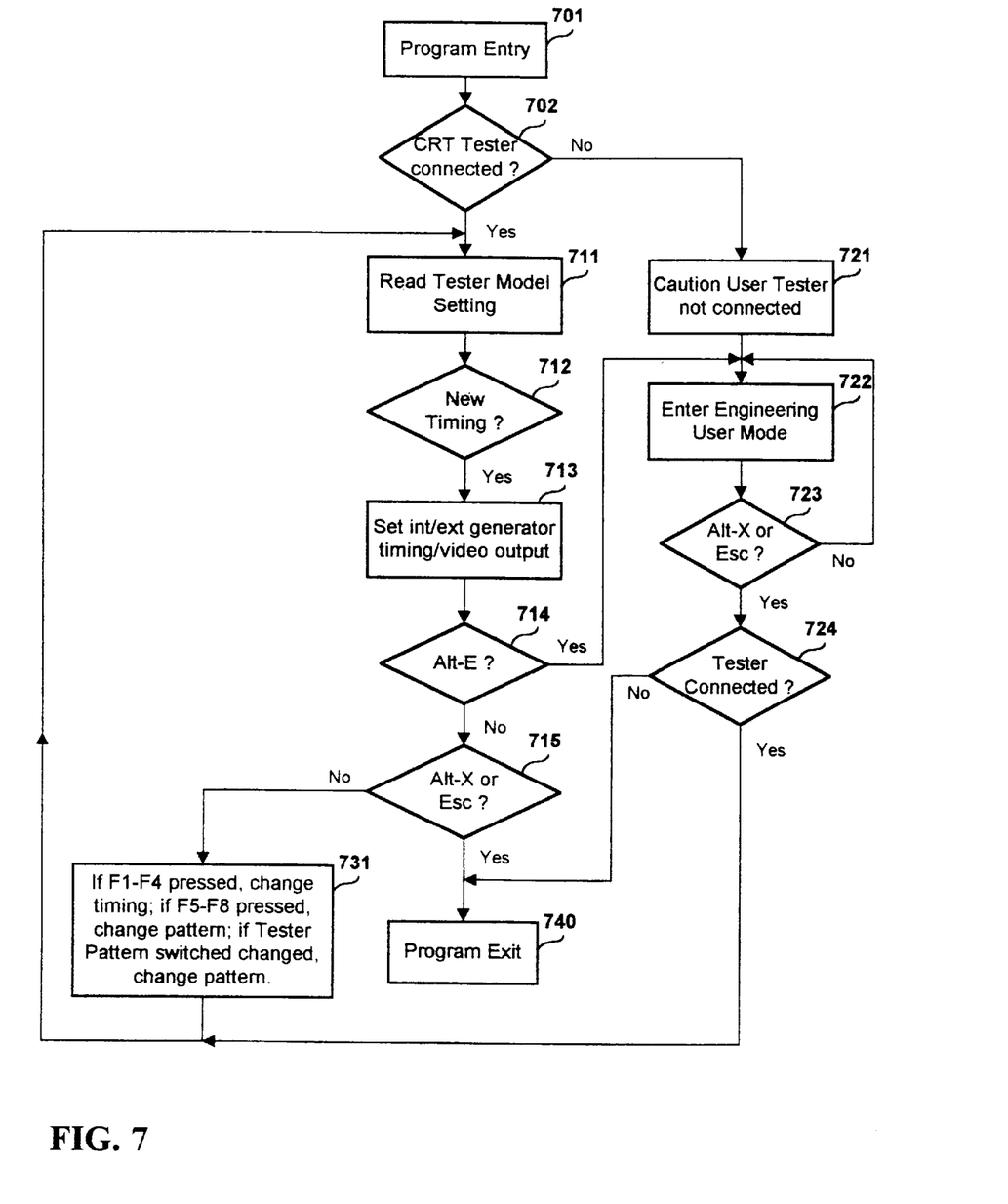
FIG. 7 shows a flow diagram of the main program carried out by a PC control the digital control CRT test system.

FIG. 7 shows a flow diagram of the main program carried out by the PC 300 to control the digital control CRT test system 100 for testing the CRT 200. The main program first checks for the connection to the digital control CRT test system 100. If connected and internal video generator is selected, the PC graphics card (not shown) installed on the PC 300 will serve as a pattern generator for generating a video signal representative of a test pattern which is sent via the video port 151 and video amplifier 150 on the digital control CRT test system 100 to the CRT 200. If not connected to the digital control CRT test system 100, the PC 300 will enter engineering mode in which all internal control registers are examined or modified.

In the flow diagram of the main program at the first step 701, the program is initiated. At step 702, the PC 300 checks whether the digital control CRT test system 100 is properly connected thereto. If yes, the procedure goes to step 711, in which the PC 300 reads via the RS-232 communication port 114 the model setting on the digital control CRT test system 100. At step 712, the PC 300 checks whether it is new timing. If no, the procedure goes to step 714; and if yes, the procedure goes to step 713 in which the PC 300 sets internal/external generator timing/video output. Subsequently at step 714, the PC 300 waits for Alt-E input from the keyboard (not shown). If Alt-E input is received, the procedure goes to step 722 which will be described later; and if not, the procedure goes to step 715, in which the PC 300 waits for Alt-X or Esc input from the keyboard. If the input is received, the procedure goes to step 740 in which the main program is ended; otherwise the procedure goes to step 731, in which the following actions are processed:

if the function keys F1 through F4 are pressed, then change timing;
if the function keys F5 through F8 are pressed, then change pattern; and
if pattern switch (not shown) on the digital control CRT test system 100 changed, then change pattern. Subsequently, the procedure returns to step 711 to repeat the action therein again.

If at step 702, the PC 300 checks that the digital control CRT test system 100 is not connected thereto, the procedure goes to step 121 in which a message is displayed to notify the operator of such a condition. Subsequently at step 722, the PC 300 enters into Engineering User Mode. At step 723, the PC 300 waits for Alt-X or Esc input from the keyboard (not shown). If not received, the procedure returns to step 722; otherwise, the procedure goes to step 724 in which the PC 300 checks again whether the digital control CRT test system 100 is properly connected thereto. If yes, the procedure goes to step 711 to perform the action therein; if not, the procedure goes to step 740 in which the main program is ended.

Figure 8:
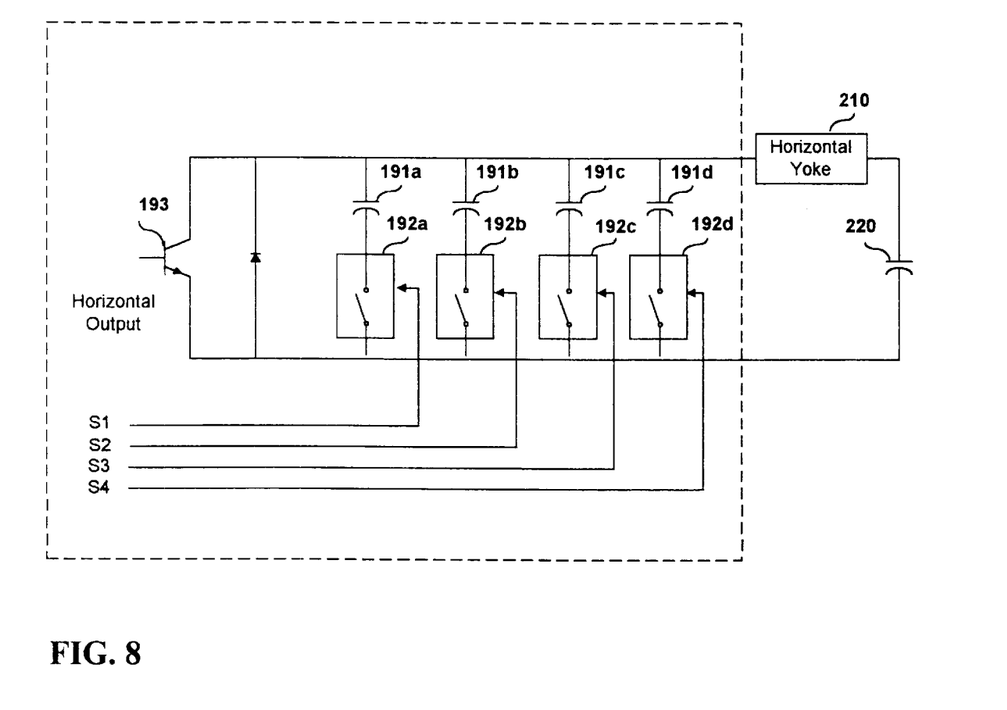
FIG. 8 shows a schematic diagram of a tuning control circuit employed in the digital control CRT test system for tuning an S capacitor by microprocessor.

FIG. 8 shows a schematic diagram of a tuning control circuit employed in the digital control CRT test system 100 for tuning an S capacitor 220 coupled to horizontal yoke 210 on the CRT via the output ports S1, S2, S3, S4 on the microprocessor 111. The tuning control circuit includes an array of four tuning capacitors 191a, 191b, 191c, and 191d respectively connected in series to relays 192a, 192b, 192c, and 192d. When any timing change is sensed, the microprocessor 111 will immediately close all the relays 192a, 192b, 192c, and 192d so as to tune the S capacitor 220, thereby limiting the surge voltage across the horizontal output transistor 193 to a safe level. When the correct number of tuning capacitors are determined, for example when the microprocessor 111 determines that S2 and S4 are to be closed then the other two ports S1 and S3 will be opened after the condition is stabilized.

Figure 9:
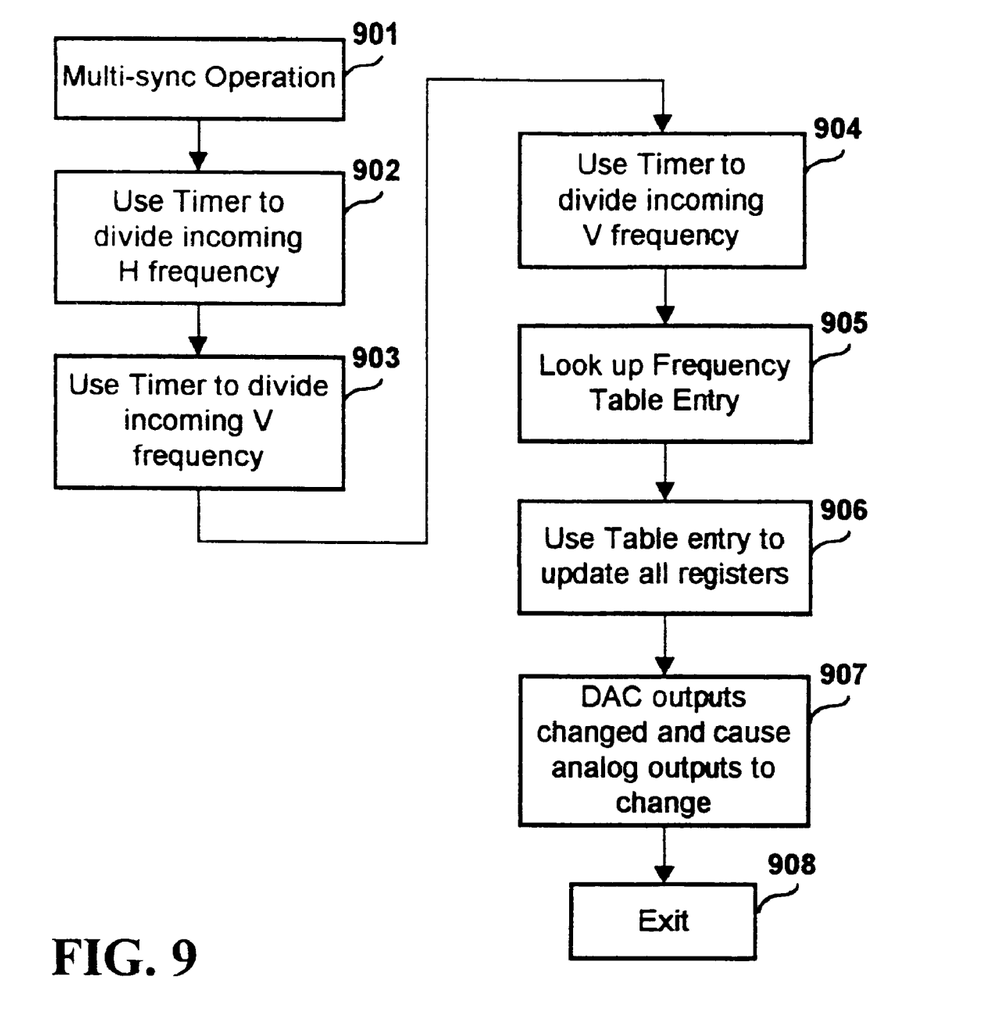
FIG. 9 shows a flow diagram of a procedure carried out by the digital control CRT test system for testing a multisync CRT.

FIG. 9 shows a flow diagram of a preferred embodiment of the procedure carried out by the microprocessor 111 for testing a multisync CRT. Referring back to FIG. 1, a frequency detector 180 is used to used to couple the video source to the timer unit 115 on the 68HC11 micro controller. The timer unit 115 thereby counts the horizontal and vertical frequency of the video source. The result is then used by the microprocessor 111 to look up a table stored on the ROM unit 114 to find the user settings corresponding to the current operating frequency.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claim should be accorded the broadest interpretation so as to encompass all such modifications and similar arrangements.

What is claimed is:

1. A test system for conducting a test on at least a part of cathode ray tube, the cathode ray tube being made up of a plurality of parts, said parts including a plurality of electrodes and peripheral components, comprising:
   (a) at least a microprocessor;
   (b) at least a nonvolatile memory unit for storing at least a test parameter data set representative of a test setting for the CRT part under test;
   (c) means, under control by said microprocessor, for setting the CRT part being tested in accordance with the test parameter data set stored in said nonvolatile memory unit, wherein said setting means comprises:
      (i) at least a digital-to-analog converter for converting the test parameter data set into an analog signal;
      (ii) analog test means, coupled between said digital-to-analog converter and the CRT part under test, for performing a test procedure on the CRT part under test, said analog test means generating an analog response signal indicative of test result; and
      (iii) at least an analog-to-digital converter, coupled between said analog test means and said microprocessor, for converting the analog response signal into digital form readable by said microprocessor;

(d) means, for detecting a response signal from the CRT part during the test procedure, the response signal being indicative of whether the CRT part under test is in good condition; and (e) means, responsive to the response signal, for generating a report indicative whether the CRT part under testing is in good condition.

2. A test system according to claim 1, wherein the plurality of electrodes under testing include a heater, at least an electron gun, a plurality of grids and an anode.

3. A test system according to claim 1, wherein the plurality of peripheral components under testing include horizontal deflection coils, vertical deflection coils, degaussing coils, convergence coils, rotation coils, and purity coils.

4. A test system according to claim 1, further comprising:
a communication port for connecting said test system with a personal computer.

5. A test system according to claim 4, wherein said communication port is an RS-232 communication port.

6. A test system according to claim 4, wherein a graphics card installed on said personal computer is used to supply a video signal representative of a test pattern to the CRT.

7. A test system according to claim 4, wherein an external pattern generator under control by said personal computer is used to supply a video signal representative a test pattern to the CRT.

8. A test system according to claim 4, wherein the test parameter data set is downloaded from said personal computer to said nonvolatile memory unit on said test system.

9. A test system according to claim 1, wherein an external pattern generator is used to supply a video signal representative of a test pattern to the CRT.

10. A test system according to claim 1, further comprising:
(i) means for detecting faults on critical points on the CRT; and
(ii) an alarm, coupled to said detecting means, for generating a message indicative of a fault being detected by said detecting means.

11. A test system according to claim 1, further comprising:
means for tuning an S capacitor coupled to a horizontal yoke on the CRT under control by said microprocessor.

12. A test system according to claim 11, wherein said tuning means comprises an array of tuning capacitors each being coupled in series to a relay having the on/off thereof controlled by a corresponding set of ports on said microprocessor.

13. A test system according to claim 1, further comprising:
in case the CRT is a multisync CRT, means for detecting a current operating frequency of the CRT and setting the CRT for testing based on a particular test parameter data set corresponding to the current operating frequency being detected.

14. A test system according to claim 13, wherein said operating frequency detecting means comprises:
a timer unit for counting the current operating frequency being detected.

15. A test system according to claim 1, wherein said nonvolatile memory unit is an EEPROM unit.

16. A test system according to claim 1, further comprising:
means for allowing said test system to be remote controlled by a remote controller.

17. A test system for conducting a test on at least one of a number of parts of a cathode ray tube, said cathode ray tube being made up of a plurality of said parts, said parts including a plurality of electrodes and peripheral components, comprising:

(a) at least a microprocessor;
(b) at least a nonvolatile memory unit for storing at least a test parameter data set representative of a test setting for the CRT part under test;
(c) means, under control by said microprocessor, for setting the CRT part under test in accordance with the test parameter data set stored in said nonvolatile memory unit, wherein said setting means comprises:
(i) at least a digital-to-analog converter for converting the test parameter data set into an analog signal;
(ii) analog test means, coupled between said digital-to-analog converter and the CRT part under test, for performing a test procedure on the CRT part under test, said analog test means generating an analog response signal indicative of test result; and
(iii) at least an analog-to-digital converter, coupled between said analog test means and said microprocessor, for converting the analog response signal into digital form readable by said microprocessor;

(d) means, for detecting a response signal from the CRT part during the test procedure, the response signal being indicative of whether the CRT part under test is in good condition; and (e) means, responsive to the response signal, for generating a report indicative whether the CRT part under test is in good condition.

18. A test system according to claim 17, wherein the plurality of electrodes includes a heater, at least an electron gun, a plurality of grids and an anode.

19. A test system according to claim 17, wherein the plurality of peripheral components include horizontal deflection coils, vertical deflection coils, degaussing coils, convergence coils, rotation coils, and purity coils.

20. A test system according to claim 17, further comprising a communication port for connecting said test system with a personal computer.

21. A test system according to claim 20, wherein said communication port is an RS-232 communication port.

22. A test system according to claim 20, wherein a graphic card installed on said personal computer is used to supply a video signal representative of a test pattern to the CRT.

23. A test system according to claim 20, wherein an external pattern generator is used to supply a video signal representative of a test pattern to the CRT.

24. A test system according to claim 20, wherein the test parameter data set is downloaded from said personal computer to said nonvolatile memory unit on said test system.

25. A test system according to claim 20, wherein an external pattern generator under control by said personal computer is used to generate a video signal representative of a test pattern to the CRT.

26. A test system according to claim 17, further comprising:
(i) means for detecting faults on critical points on the CRT; and
(ii) an alarm, coupled to said detecting means, for generating a message indicative of a fault being detected by said detecting means.

27. A test system according to claim 17, further comprising:
means for tuning an S capacitor coupled to a horizontal yoke on the CRT under control by said microprocessor.

28. A test system according to claim 27, wherein said tuning means comprises an array of tuning capacitors each being coupled in series to a relay having the on/off thereof controlled by a corresponding set of ports on said microprocessor.

29. A test system according to claim 17, further comprising:

in case the CRT is a multisync CRT, means for detecting current operating frequency of the CRT and setting the CRT for testing based on a particular test parameter data set corresponding to the current operating frequency being detected.

30. A test system according to claim 29, wherein said operating frequency detecting means comprises a timer unit for counting the current operating frequency being detected.

31. A test system according to claim 17, further comprising means for allowing said test system to be remote controlled by a remote controller.

\* \* \* \* \*